United States Patent [19]
Chambers, Sr.

[11] Patent Number: 5,408,780
[45] Date of Patent: Apr. 25, 1995

[54] SYSTEM FOR IMPARTING COLORATION TO AN ARTIFICIAL FISHING LURE

[75] Inventor: William E. Chambers, Sr., Watkinsville, Ga.

[73] Assignee: Zoom Bait Company, Inc., Athens, Ga.

[21] Appl. No.: 227,895

[22] Filed: Apr. 15, 1994

Related U.S. Application Data

[63] Continuation of Ser. No. 995,596, Dec. 22, 1992, abandoned.

[51] Int. Cl.$^6$ ............................................. A01K 85/00
[52] U.S. Cl. .................. 43/42.53; 43/42.24; 43/42.32; 43/42.33
[58] Field of Search ................ 43/42.53, 42.24, 42.32, 43/42.33

[56] References Cited

U.S. PATENT DOCUMENTS

| | | | |
|---|---|---|---|
| 2,054,454 | 9/1936 | Thies | 43/42.32 |
| 2,520,444 | 8/1950 | Smith | 43/42.32 |
| 3,367,060 | 2/1968 | Abercrombie | 43/42.33 |
| 3,879,883 | 4/1975 | Strader | 43/42.32 |
| 4,862,631 | 9/1989 | Wilson | 43/42.33 |
| 4,956,934 | 9/1990 | Dahl | 43/42.32 |
| 5,007,193 | 4/1991 | Goodley | 43/42.53 |
| 5,062,235 | 11/1991 | Cook, Jr. | 43/42.53 |

FOREIGN PATENT DOCUMENTS

| | | | |
|---|---|---|---|
| 486258 | 9/1952 | Canada | 43/42.33 |
| 2533492 | 2/1977 | Germany | 43/42.33 |
| 0051939 | 5/1981 | Japan | 43/42.32 |

OTHER PUBLICATIONS

Bass Pro Shops 1990 catalog pp. 224–225.

Primary Examiner—Kurt Rowan
Attorney, Agent, or Firm—Andrus, Sceales, Starke & Sawall

[57] ABSTRACT

A system for imparting coloration to an artificial fishing lure formed of a soft resilient plastic material involves dispersing a large number of colored particles throughout the material. The plastic material is preferably clear, and the color of the particles imparts coloration to the material. The particles may take the form of colored short synthetic fibers, which are added to and dispersed throughout the plastic material when it is in a liquid state. The fibers are then dispersed throughout the plastic material when it is molded into the desired form for the lure.

10 Claims, 1 Drawing Sheet

SYSTEM FOR IMPARTING COLORATION TO AN ARTIFICIAL FISHING LURE

CROSS REFERENCE TO RELATED APPLICATION

This application is a continuation of application Ser. No. 07/995,596, filed Dec. 22, 1992, now abandoned.

BACKGROUND AND SUMMARY

This invention relates to fishing lures, and more particularly to colored artificial fishing lures.

Soft plastic artificial fishing lures are commonly used by fisherman. Soft plastic lures come in a variety of shapes, sizes and colors. Manufacturers of such lures typically offer a wide range of colors for their products, and it is thought that certain fish are attracted to certain colors, depending upon the weather, the condition of the water, and the type of fish.

It is common to color soft plastic artificial fishing lures by mixing a dye with the plastic material while it is in a liquid state prior to molding. The dye mixes with and alters the molecular structure of the plastic, and the color of the dye is permanently dispersed throughout the plastic. When the dyed liquid plastic is molded, the end product is a colored soft plastic artificial fishing lure.

It is an object of the present invention to provide a unique system for imparting coloration to a soft plastic artificial fishing lure, which provides a highly unusual appearance to the lure while imparting coloration to the lure. It is a further object of the invention to provide a lure coloration system which is relatively inexpensive and easy to carry out. Yet another object of the invention is to provide a lure coloration system capable of providing a wide range of colors and color intensity for the lure.

In accordance with one aspect of the invention, an artificial fishing lure includes a body formed of a translucent plastic material. A large number of colored particles are dispersed throughout the body, to impart coloration to the body. In a preferred form, the translucent plastic material is a clear plastic material, and the colored particles are in the form of short colored synthetic fibers dispersed throughout the clear plastic material. Optionally, light-reflective particles may be dispersed throughout the body along with the colored particles.

The invention further involves a method of making an artificial fishing lure. The method includes the steps of forming a body for the lure of a translucent plastic material, and dispersing a large number of colored particles throughout the body for imparting coloration to the body. The step of forming the body of a translucent plastic material is carried out by forming the body of a clear plastic material. The colored particles are added to the clear plastic material while the clear plastic material is in a liquid state, and the clear plastic material is then molded into the body. The colored particles are thus dispersed throughout the body to impart coloration thereto corresponding to the color of the particles.

The invention further contemplates an artificial fishing lure formed in accordance with the above-summarized steps.

Various other features, objects and advantages will be made apparent from the following description taken together with the drawings.

BRIEF DESCRIPTION OF THE DRAWINGS

The drawings illustrate the best mode presently contemplated of carrying out the invention.

In the drawings.

DETAILED DESCRIPTION OF THE INVENTION

Figure 1:
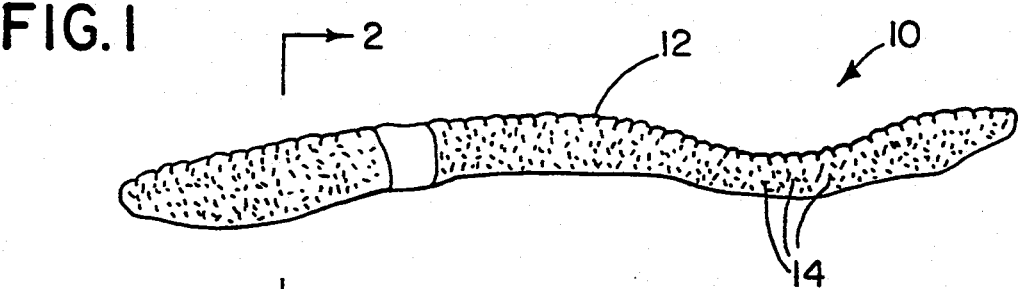
FIG. 1 is a representation of an artificial fishing lure in the form of a worm, incorporating the coloration system of the invention.
Figure 2:
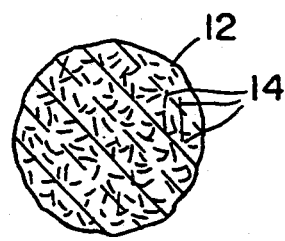
FIG. 2 is a section view taken along line 2—2 of FIG. 1.

FIG. 1 illustrates an artificial fishing lure 10 in the form of a worm 12. Worm 12 is formed of a resilient soft vinyl translucent plastic material. A large number of colored particles, in the form of short colored synthetic fibers 14, are dispersed throughout the translucent plastic material from which worm 12 is formed.

The translucent plastic material from which worm 12 is formed is preferably a clear plastic material. Fibers 14 are colored, so that the color of fibers 14 is visible through the clear plastic material from which worm 12 is formed. Thus, worm 12 assumes the color of fibers 14. The intensity of the color imparted to worm 12 by fibers 14 depends upon the density of fibers 14. The more dense the concentration of fibers 14 within worm 12, the more intense the color imparted to worm 12 by fibers 14. Conversely, the intensity of the color lessens as the density of fibers 14 is decreased.

Figure 3:
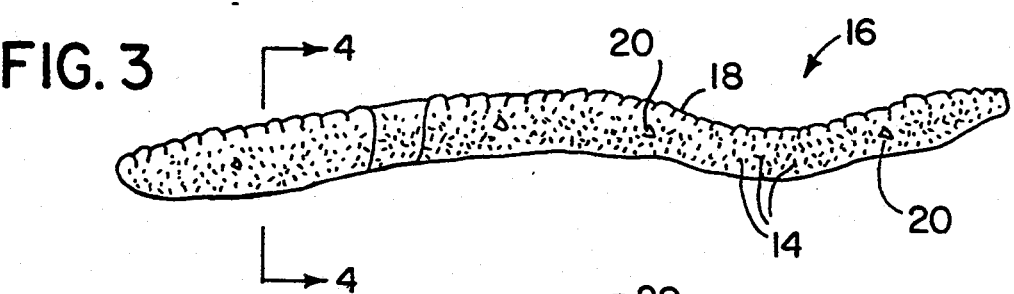
FIG. 3 is a view similar to FIG. 1, showing light-reflective particles incorporated in the lure along with the colored particles.
Figure 4:
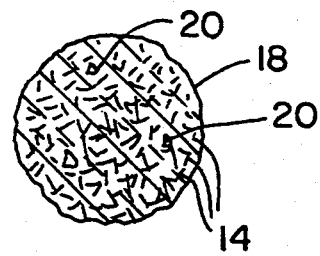
FIG. 4 is a section view taken along line 4—4 of FIG. 3.

FIG. 3 illustrates an artificial fishing lure 16 in the form of a worm 18. As before, worm 18 is formed of a clear plastic material, and colored fibers 14 are dispersed throughout worm 18 to impart coloration thereto. In addition, light-reflective particles 20 are dispersed throughout worm 18. Light-reflective particles 20 are preferably in the form of glitter, and may be either colored or non-colored. Preferably, light-reflective particles 20 are incorporated into relatively light colored artificial fishing lures, so that the light is allowed to penetrate through the clear plastic material and to reflect off light-reflective particles 20.

Worms 12, 18 are made of a resilient plastic, most preferably a soft vinyl plastisol. Fibers 14, and light-reflective particles 20 if used, are incorporated into the plastisol while the plastisol is in a liquid state. The plastisol is thereafter heated to a gelation or fusion temperature to give it a desired resilience and strength. The plastisol is formed of a resin, such as is available from the BF Goodrich Company under the designation Geon 121, and a plasticizer, such as is available from Monsanto Corporation under its designation 711. In addition, a stabilizer can be incorporated into the plastisol, such as a high heat stabilizer available from Ferro Chemical Company under its designation BH00624. As an example, the resin may be added in the proportion of approximately 50 pounds to 30 to 32 gallons of plasticizer, and 2 gallons of stabilizer are added to the resin and plasticizer mixture.

After the resin, plasticizer and stabilizer are combined, colored fibers 14 are added to the mixture and the mixture is stirred to disperse fibers 14 throughout. Illustratively, fibers 14 are particles of flock material, such as is available from Donjer Products of Belle Meade, N.J. Fibers 14 are cellulosic fiber particles formed of a synthetic material such as rayon. Fibers 14 are approximately 1/32 (0.030) inches in length, and have a thickness of approximately 3 denier.

Fibers 14 are light in weight, and it is necessary to vigorously stir the mixture to which fibers 14 are added in order to prevent fibers 14 from clotting. Once fibers 14 are incorporated into the liquid plastisol, the plastisol is then placed in molds for molding by known techniques, such as injection molding. In the molding process, the plastisol is heated to its gelation temperature, typically on the order of about 200°–400° F. while it is being molded, and is removed from the mold when it has achieved the desired physical properties.

When fibers 14 are added to the liquid plastisol mixture, light-reflective particles 20 can also be added for mixing therewith and for incorporation into the final molded product.

Representatively, applicant has employed a ratio of 36 tablespoons of fibers 14 to 5 gallons of clear liquid plastisol mixture. This ratio has been found adequate to impart color of a sufficient intensity to the final product. Of course, a greater or lesser amount of particles can be employed to vary the color intensity.

In addition, it is understood that various other components can be incorporated into the liquid plastisol mixture. For example, it is known to incorporate fish attractant substances into the plastic material, or other materials such as salt, banana oil or the like.

Figure 5:
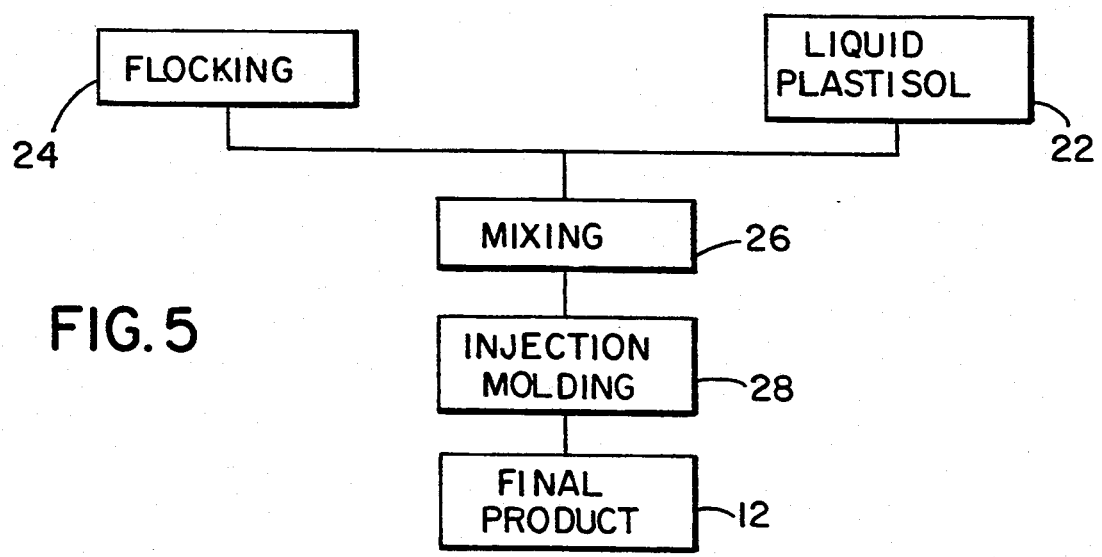
FIG. 5 is a schematic representation of the steps involved in the method of forming the artificial fishing lures of FIGS. 1 and 3.

FIG. 5 generally illustrates the steps described above in forming lures 10, 16. The step of providing the liquid plastisol mixture is shown at 22, and adding fibers 14 to the liquid plastisol is shown at 24. The liquid plastisol and fibers are mixed together at mixing step 26, and the liquid plastisol with fibers 14 dispersed throughout are molded at injection molding step 28 to yield the final product, i.e. worm 12. When light-reflective particles 20 are included, an additional step of adding glitter is incorporated into the FIG. 5 method prior to mixing step 26.

The coloration system provided by the invention essentially involves particles suspended in the plastic to impart coloration thereto, in contrast with dyed plastic coloration. When a clear plastic medium is dyed, the dye transforms the medium and can reflect only one color within the light spectrum. Any glitter or other particles thereafter suspended in the dyed plastic, instead of retaining their color or identity, are affected by the dyed colors of the medium. The coloration process of the present invention does not involve coloring the medium itself, and accordingly the medium allows glitter particles to reflect all colors within the light spectrum.

The coloration process of the invention offers almost unlimited opportunity for color distinction and subtleties. Instead of irrevocably altering the medium with dyes, the particles are mixed into the plastic to create the illusion of colored plastic, but variations in color in any single piece of plastic may range through the light spectrum. Glitter or other sparkling particles will retain an identity that may vary from simple mirrors and clear parts of the medium, to any shade or hue that may impose on that area of coloration. The coloration process of the invention offers the variety of spectral chords which occur in life, and particularly in watery environments where fish and creatures exist whose surfaces may reflect very subtle nuances of color, and may even be transparent to render the internal organs visible. The present invention allows such subtlety in color variations to be achieved.

The coloration process of the invention further allows a manufacturer to remove particles from the liquid plastic medium by straining, if too many particles have been added or if for any other reason it is desired to lessen the intensity of color provided by the particles. It should be appreciated, of course, that this cannot be accomplished when dye is used to impart coloration to the medium.

It should also be appreciated that any satisfactory colored particles can be employed in place of fibers 14 as specifically described, to impart coloration to an artificial fishing lure.

Further, it is understood that any form of artificial fishing lure can be colored using the coloration system of the invention, and that lures such as minnows, frogs, lizards, or any other form can be colored using the inventive coloration system.

Various alternatives and embodiments are contemplated as being within the scope of the following claims particularly pointing out and distinctly claiming the subject matter regarded as the invention.

I claim:

1. An artificial fishing lure, comprising:
   a body formed of a translucent plastic material; and
   a plurality of short fibrous colored particles dispersed substantially entirely and uniformly throughout the translucent material of the body in a quantity and concentration sufficient to impart a uniform coloration to the body, wherein the fibers have a thickness of approximately 3 denier and a length of approximately 0.030 inches.

2. The artificial fishing lure of claim 1, wherein the translucent plastic material from which the body is formed comprises a clear plastic material.

3. The artificial fishing lure of claim 1, further comprising a plurality of light-reflective particles dispersed throughout the body along with the colored particles.

4. A method of making an artificial fishing lure, comprising the steps of:
   forming a body for the lure of a translucent plastic material; and
   dispersing a plurality of short fibrous colored particles substantially entirely and uniformly throughout the translucent material of the body in a quantity and concentration sufficient to impart a uniform coloration to the body, wherein the fibers have a thickness of approximately 3 denier and a length of approximately 0.030 inches.

5. The method of claim 4, wherein the step of forming the body of a translucent plastic material comprises forming the body of a clear plastic material.

6. The method of claim 4, further comprising the step of dispersing a plurality of light-reflective particles throughout the body along with the plurality of colored short synthetic fibers.

7. A method of making an artificial fishing lure, comprising the steps of:
   providing a quantity of clear plastic material in a liquid state;
   adding a plurality of short fibrous colored particles to the clear plastic material;

dispersing the colored particles substantially uniformly throughout the clear plastic material; and molding the clear plastic material into a body for the lure, wherein the colored particles are dispersed uniformly throughout the entirety of the body in a quantity and concentration sufficient to impart a uniform coloration thereto corresponding to the color of the particles, wherein the fibers have a thickness of approximately 3 denier and a length of approximately 0.030 inches.

8. The method of claim 7, further comprising the step of adding a plurality of light-reflective particles to the clear plastic material prior to molding the clear plastic material into the body.

9. An artificial fishing lure, comprising a body formed by providing a quantity of clear plastic material in a liquid state; dispersing a plurality of short fibrous colored particles substantially uniformly throughout the liquid plastic material, the particles having a thickness of approximately 3 denier and a length of approximately 0.030 inches; and molding the liquid plastic material into a body for the lure, wherein the colored particles are dispersed uniformly throughout the entirety of the clear plastic material forming the body in a quantity and concentration sufficient to impart a uniform coloration to the body corresponding to the color of the particles.

10. The artificial fishing lure of claim 9, wherein forming of the body further includes the step of dispersing a plurality of light-reflective particles throughout the clear plastic material along with the plurality of colored short synthetic fibers.

* * * * *